(12) United States Patent
Takahashi (10) Patent No.: US 10,255,531 B2
(45) Date of Patent: Apr. 9, 2019

(54) INKJET PRINTER AND INKJET RECORDING METHOD

(71) Applicant: Roland DG Corporation, Hamamatsu-shi, Shizuoka (JP)

(72) Inventor: Ayako Takahashi, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 18 days.

(21) Appl. No.: 15/787,736

(22) Filed: Oct. 19, 2017

(65) Prior Publication Data

US 2018/0113657 A1 Apr. 26, 2018

(30) Foreign Application Priority Data

Oct. 21, 2016 (JP) ................ 2016-206713

(51) Int. Cl.
*G06F 3/12* (2006.01)
*G06K 15/02* (2006.01)
*B41J 2/01* (2006.01)
*B41J 29/393* (2006.01)
*B41J 2/175* (2006.01)

(52) U.S. Cl.
CPC ........... *G06K 15/1823* (2013.01); *B41J 2/01* (2013.01); *B41J 2/17509* (2013.01); *B41J 29/393* (2013.01); *G06F 3/125* (2013.01); *G06F 3/1215* (2013.01); *G06K 15/1856* (2013.01); *B41J 2029/3935* (2013.01); *G06K 2215/101* (2013.01)

(58) Field of Classification Search
CPC .............. G06F 3/1215; G06K 15/1823; G06K 2215/101
See application file for complete search history.

(56) References Cited

U.S. PATENT DOCUMENTS 9,688,081 B1* 6/2017 Zengo .................. B41J 11/002
2003/0234851 A1* 12/2003 Booth ....................... B41J 3/28
347/104

FOREIGN PATENT DOCUMENTS

JP 2015-125506 A 7/2015

\* cited by examiner

*Primary Examiner* — Kristal Feggins
*Assistant Examiner* — Kendrick X Liu
(74) *Attorney, Agent, or Firm* — Keating & Bennett, LLP (57) ABSTRACT

An inkjet printer system that records images in a shorter time while taking ink drying time into account includes an output data generator including an ink information acquirer, a hard-to-dry index acquirer, a first image setter, a first area setter, and a layout arranger. The ink information acquirer acquires, for two or more images, ink information including an amount of ink required to record the images. The hard-to-dry index acquirer acquires, for each of the two or more images, a hard-to-dry index calculated from the ink information and indicating how difficult the ink is to dry. The first image setter sets an image having a highest hard-to-dry index to be a first image. The first area setter sets a first area in a recording area of a recording medium that is upstream in a conveying direction. The layout arranger arranges the first image in the first area earlier than other images.

6 Claims, 9 Drawing Sheets

| | INK AMOUNT LIST | AREA LIST | HARD-TO-DRY INDEX LIST | |
|---|---|---|---|---|
| G1 | 6 | 1 | 6 | |
| G2 | 4 | 2 | 4 | |
| G3 | 1 | 3 | 1 | → Zn |
| G4 | 3 | 6 | 2 | |
| G5 | 5 | 4 | 5 | |
| G6 | 2 | 5 | 3 | |

FIG.7C

| DRYING DIFFICULTY LEVEL LIST | | |
|---|---|---|
| 1 | G3 | → Zn |
| 2 | G4 | |
| 3 | G6 | |
| 4 | G5 | |
| 5 | G2 | |
| 6 | G1 | |

INKJET PRINTER AND INKJET RECORDING METHOD

CROSS REFERENCE TO RELATED APPLICATIONS

This application claims the benefit of priority to Japanese Patent Application No. 2016-206713 filed on Oct. 21, 2016. The entire contents of this application are hereby incorporated herein by reference.

BACKGROUND OF THE INVENTION

1. Field of the Invention

The present invention relates to inkjet printers and inkjet recording methods.

2. Description of the Related Art

Inkjet printers are well known to eject droplets of ink onto a recording medium and cause the ink to adhere to the recording medium to record an intended image on the recording medium. In such an inkjet printer, object image data created with, for example, a computer are converted into output data through a device or software having a raster image processor (RIP) function, and based on the converted output data, the image is recorded.

In the recording with a printer, it is often the case that a plurality of images are recorded on one recording medium. In that case, as disclosed in, for example, JP 2015-125506 A, a plurality of image data are put into one set of output data by the RIP function and recorded in the recording medium by means of one output instruction. At that time, for example, a nesting function, by which a plurality of images are arranged with no gap between the images, is used to generate the output data, so that the required amount of recording medium can be reduced.

Users have a variety of requirements for recording depending on their purposes of recording. Typical examples of such requirements are reductions in recording cost and recording time. For example, the above-mentioned nesting can minimize the required amount of recording medium and can therefore contribute to the reduction in time required to record. However, the present inventors have discovered that, in terms of reducing the time required to record a plurality of images, there is room for further improvement.

SUMMARY OF THE INVENTION

Preferred embodiments of the present invention provide inkjet printer systems that record a plurality of images in a short time taking ink drying time into consideration. In another aspect, preferred embodiments of the present invention provide inkjet recording methods that record a plurality of images in less time taking ink drying time into consideration.

An inkjet printer system according to a preferred embodiment of the present invention includes an image data acquirer acquiring two or more sets of image data concerning images each being a recording target; a medium information acquirer acquiring medium information including information representative of a recording area concerning a recording medium in which the images are to be recorded; an output data generator generating a set of output data by combining the two or more sets of image data such that two or more of the images corresponding to the image data are arranged so as to be in the recording area and not to be superposed on each other; and a recorder recording the two or more images by ejecting at least one ink onto the recording medium based on the output data while conveying the recording medium in a conveying direction. The output data generator includes an ink information acquirer acquiring, for each of the two or more images, ink information including an amount of ink required to record the image; a hard-to-dry index acquirer acquiring, for each of the images, a hard-to-dry index calculated from the ink information and indicating how difficult the ink is to dry; a first image setter setting one of the images having a highest hard-to-dry index to be a first image; a first area setter setting a first area in the recording area of the recording medium, the first area being upstream in the conveying direction; and a layout arranger arranging the first image in the first area earlier than other images.

An inkjet recording method according to a preferred embodiment of the present invention includes acquiring sets of image data corresponding to two or more images each being a recording target; acquiring medium information including a recording area concerning a recording medium in which the images are to be recorded; generating output data by combining two or more sets of the image data so that the two or more images corresponding to the two or more sets of image data are arranged so as to be in the recording area and not to be superposed on each other; and recording the two or more images by ejecting ink onto the recording medium based on the output data while conveying the recording medium in a conveying direction. The generating of output data includes acquiring, for each of the two or more images, ink information including an amount of the ink required to record each of the two or more images; acquiring, for each of the images, a hard-to-dry index calculated from the ink information and indicating how difficult the ink is to dry; setting one of the images having a highest hard-to-dry index to be a first image; setting a first area in the recording area of the recording medium, the first area being upstream in the conveying direction; and arranging the first image in the first area earlier than other images.

In inkjet recording, the ink is more difficult to dry when the ink droplets are ejected relatively densely than when the ink droplets are ejected sparsely. Also, the ink is more difficult to dry when the ink droplets are relatively large than when the ink droplets are relatively small. The reason is mainly as follows. That is, as for the ink used in recording, the ink in a liquid phase is ejected onto a recording medium, thereafter the solvent (which may be a dispersion medium) evaporates while being infiltrated into the recording medium, and the ink is turned into a solid phase and fixed (i.e., dried). In that case, when the infiltration area is wider with respect to the amount of ink, the solvent evaporates more quickly. Accordingly, in recording an image, the time required for the ink to dry varies depending on the contents of the image.

In addition, generally in the inkjet recording, an image is divided into a plurality of lines. After an image of one divided line is recorded along a main scanning direction, the recorder is moved in a sub-scanning direction, and the next line is recorded. By repeating these operations, the entire image is recorded. In this process, drying of ink starts immediately after the ink is ejected. Therefore, when the last one of the divided images is recorded, the ink that was ejected to record the first one of the divided images has already been in a more dried condition.

Accordingly, when a plurality of images are to be recorded, the required time from when the first image starts to be recorded to when the last image dries up (which is hereinafter also referred to simply as "required time") may vary depending on the order of recording of the images, although the required time for only the recording of all the images is invariable. When recording a plurality of images, the technology disclosed herein identifies an image that requires the longest time for drying and arranges the identified image in the first area, which ensures the longest drying time in recording.

Such a configuration allows one of a plurality of images that requires the longest drying time to be provided with a long time for drying after the recording. Therefore, the technology disclosed herein makes it possible to reduce, in recording a plurality of images, the required time from when the first one of the images starts to be recorded to when the last one of the images dries up.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the present specification, the term "inkjet" means an ink supply technique in which liquid phase ink is ejected in the form of tiny droplets to cause the ink to adhere at desired positions. The technique or system used for forming droplets of ink is not limited to any particular technique or system. For example, any conventionally known system may be used without any particular restriction, including various continuous type systems such as binary deflection systems and continuous deflection systems, as well as various on-demand systems including thermal systems and piezoelectric systems.

Also, there is no particular restriction on the type of ink used for inkjet recording, and it may be various types of liquid (including fluids and viscos substances, likewise hereinafter) containing a colorant and a solvent (which may be a dispersion medium). The colorant may be at least one of pigment and dye. The solvent may contain at least one of aqueous solvent, oil-based solvent, and volatile solvent. The pigment and the dye are not limited to any particular type, and they may include one or more types of various compounds that are commonly used for this kind of ink. Examples of such ink typically include pigment ink (such as aqueous pigment ink), dye ink (such as aqueous dye ink), and solvent pigment ink. It is also possible to adopt dye sublimation ink, which is used for a printing technique called sublimation transfer printing, in which ink is printed on a recording medium called transfer paper in advance and then heated with a transfer machine so that the ink is transferred from the transfer paper to fabric.

The recording medium is a subject onto which the inkjet printer system carries out recording. The recording medium may be made of any material, and in any shape. For example, in terms of shape, the recording medium may be a planar object in a flexible sheet shape or in a rigid plate shape, or may be any three-dimensional object, such as various types of cases, commodities, small electronic devices, and small machine parts and components. The material may be selected from a wide range of materials containing at least one of the following: a polymer material such as polyvinyl chloride (PVC), acrylic resin, polyethylene terephthalate (PET), acrylonitrile-butadiene-styrene (ABS) copolymer, and polycarbonate (PC); an organic material such as paper, natural leather, and fabric; a metallic material such as aluminum alloy, gold, silver, copper, and stainless steel; and an inorganic material such as earthenware, ceramic, and glass. A typical example of the recording medium is recording paper. The recording paper may be one treated with a surface treatment for increasing water absorption capability or drying capability, or one that is not treated with such a surface treatment.

Hereinbelow, inkjet printer systems and inkjet recording methods according to preferred embodiments of the present invention disclosed herein will be described with reference to the drawings as appropriate. For the inkjet printer system and the inkjet recording method disclosed herein, the preferred embodiments hereinbelow describe examples in which pigment ink or dye ink is used as the ink and a long and large size recording paper roll is used as the recording medium. It should be noted that the preferred embodiments described herein are not intended to limit the scope of the present invention. In the drawings, the features and components that exhibit the same effects are denoted by the same reference symbols, and repetitive description thereof may be omitted.

Figure 1:
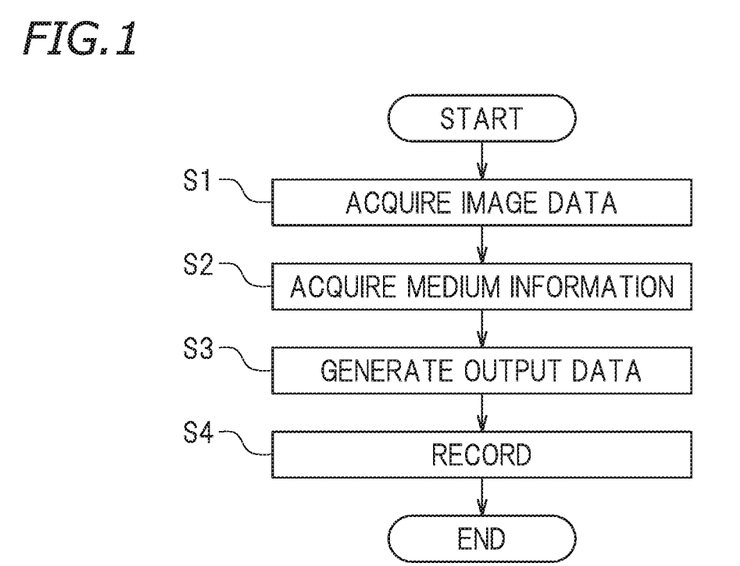
FIG. 1 is a flow-chart for illustrating an inkjet recording method according to a preferred embodiment of the present invention.
Figure 2:
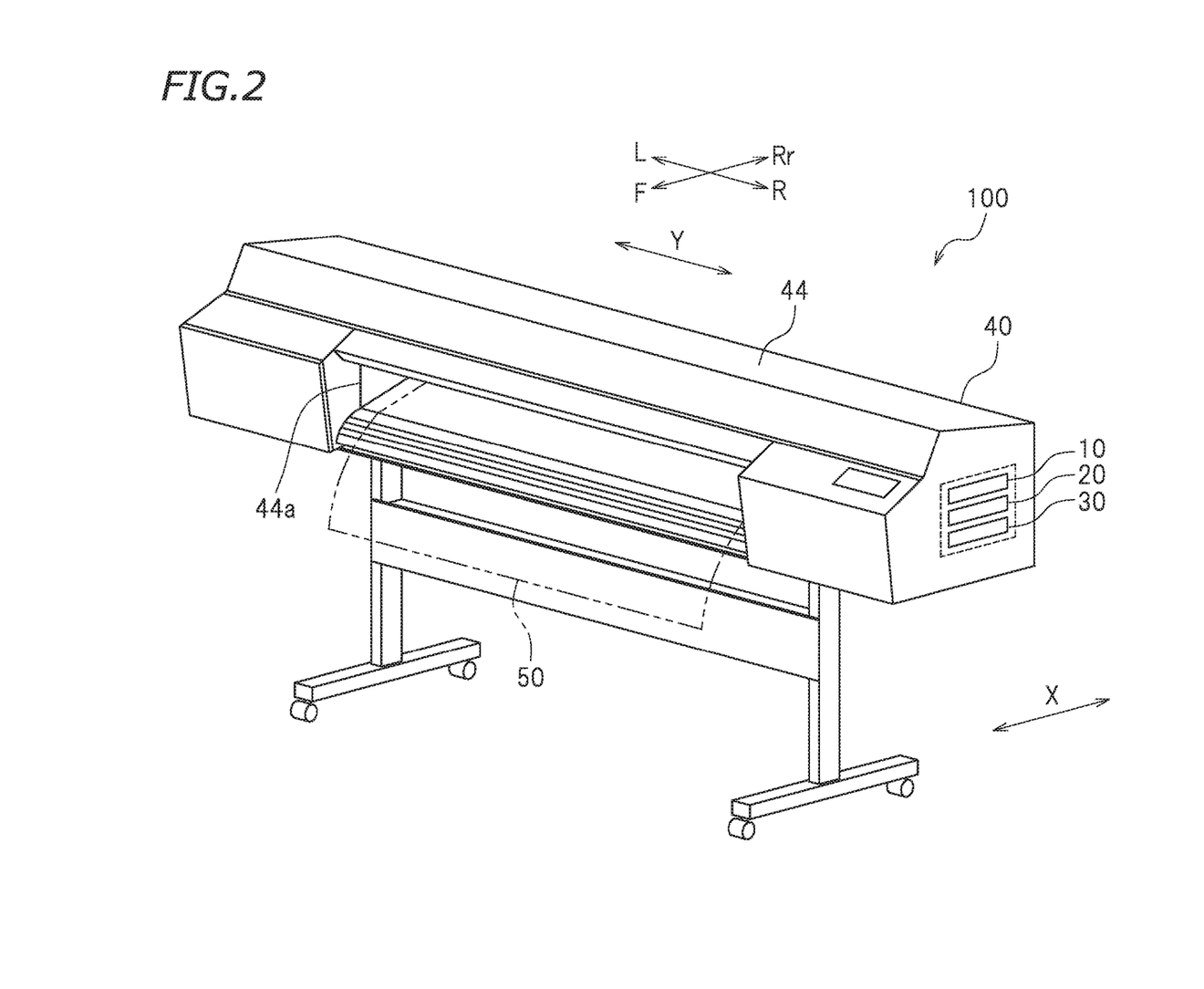
FIG. 2 is a perspective view illustrating an inkjet printer system according to a preferred embodiment of the present invention.
Figure 3:
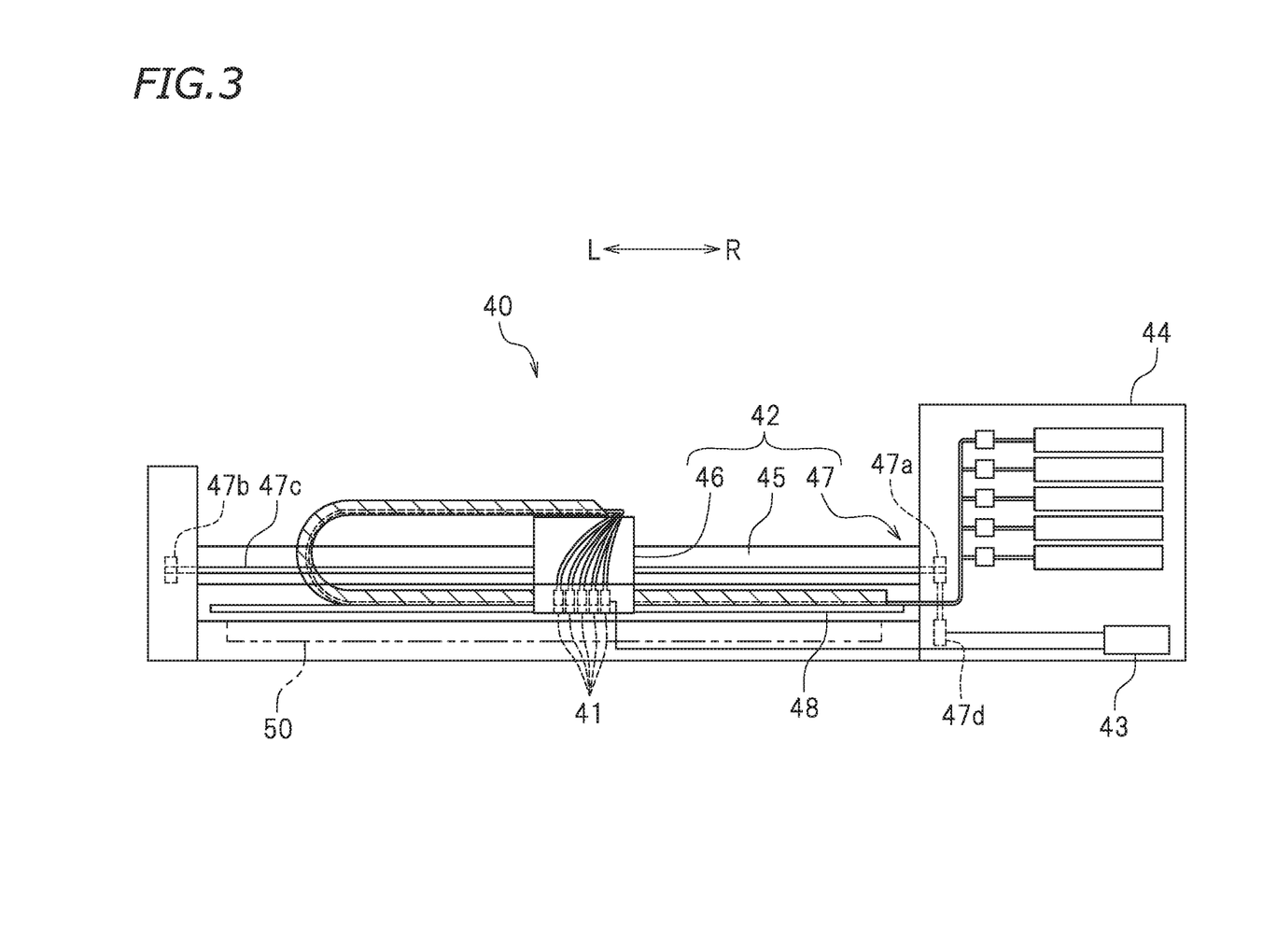
FIG. 3 is a front view illustrating main elements of the inkjet printer system.
Figure 4:
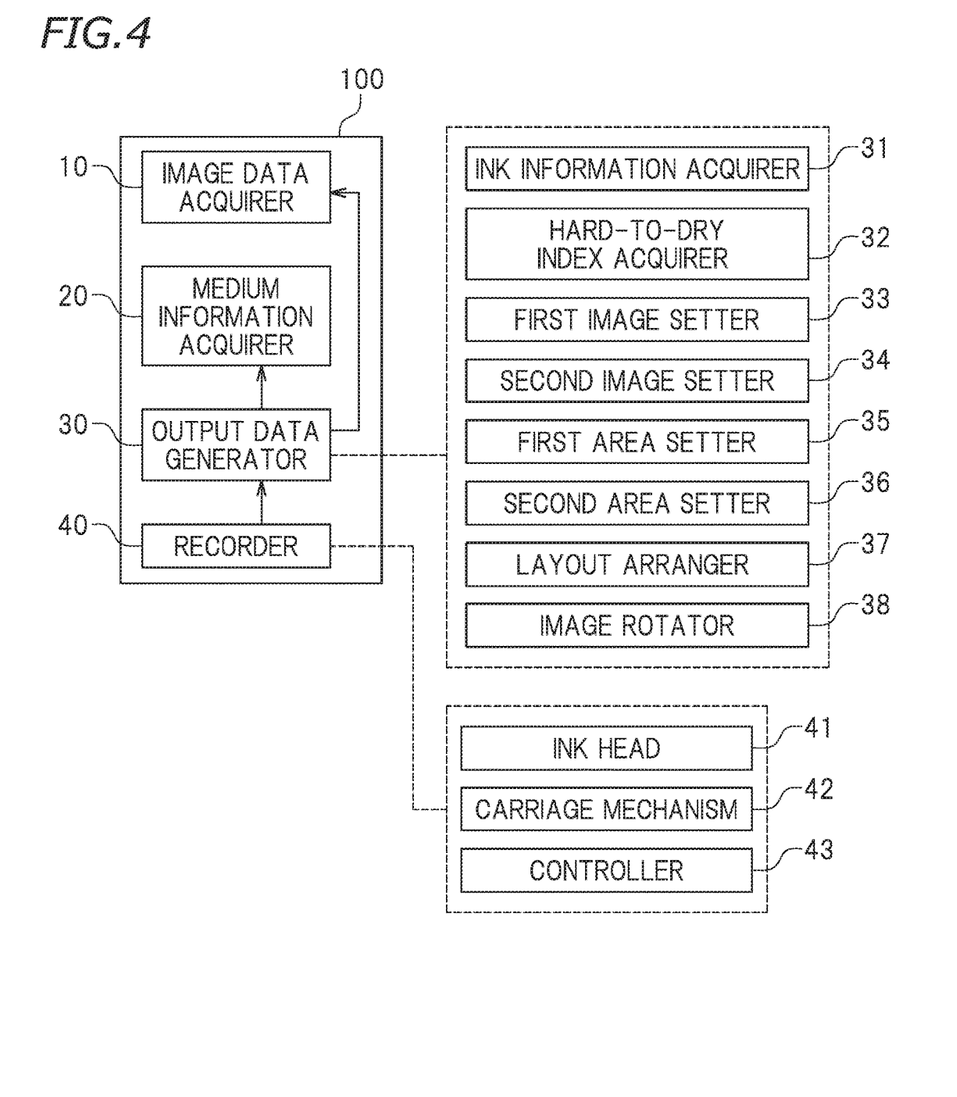
FIG. 4 is a block diagram illustrating the inkjet printer system according to a preferred embodiment of the present invention.

FIG. 1 is a flow-chart illustrating an inkjet recording method disclosed herein. FIG. 2 is a perspective view illustrating an inkjet printer system 100 according to a preferred embodiment of the present invention. FIG. 3 is a front view illustrating main elements of the inkjet printer system 100. In FIGS. 2 and 3, reference characters L and R indicate left and right, respectively, and reference characters F and R indicate front and rear, respectively. In the drawings, the front-to-rear axis corresponds to a later-described conveying direction in which the recording medium is conveyed, and front and rear are respectively in agreement with upstream (toward an end that is printed first, or a preceding end) and downstream (toward an end that is printed later, or a succeeding end) along the conveying direction. These directional terms are, however, merely provided for purposes in illustration and are not intended to limit the preferred embodiments of the inkjet printer system 100 in any way. FIG. 4 is a block diagram illustrating the inkjet printer system 100.

As illustrated in FIG. 1, an inkjet recording method disclosed herein essentially includes the following steps.

(S1) Acquiring sets of image data respectively corresponding to a plurality of images each of which is a recording target.

(S2) Acquiring medium information including information representative of a recording area concerning a recording medium in which the images are to be recorded.

(S3) Generating output data by combining two or more sets of the acquired image data, so that the two or more images corresponding to the two or more sets of acquired image data are arranged so as to be in a recording area and not to be superposed on each other.

(S4) Recording the images by ejecting ink onto the recording medium based on the output data while conveying the recording medium in a conveying direction.

Of steps S1 to S4, the order in which steps S1 and S2 are performed is not limited. Either one of steps S1 and S2 may be carried out earlier than the other one, or they may be carried out at the same time. On the other hand, steps S3 and S4 should be carried out in that order after steps S1 and S2 are carried out.

Such an inkjet recording method may preferably be performed by, but not limited to, the inkjet printer system 100 disclosed herein, for example. The inkjet printer system 100 essentially includes an image data acquirer 10, a medium information acquirer 20, an output data generator 30, and a recorder 40. The image data acquirer 10, the medium information acquirer 20, and the output data generator 30 may be implemented by hardware components, or may be implemented functionally by execution of a computer program by a central processing unit (CPU). The hardware may be implemented by, for example, a circuit provided in an inkjet printer. The technology disclosed herein also includes a computer program for printing that enables a computer to function as the above-described components. The technology disclosed herein may include a computer readable recording medium in which the computer program is recorded. This recording medium does not include a propagating signal or signals that does not keep its form, such as signal and carrier waves. The technology disclosed herein further includes a computer program that enables a computer to function as the above-described components.

Figure 7A:
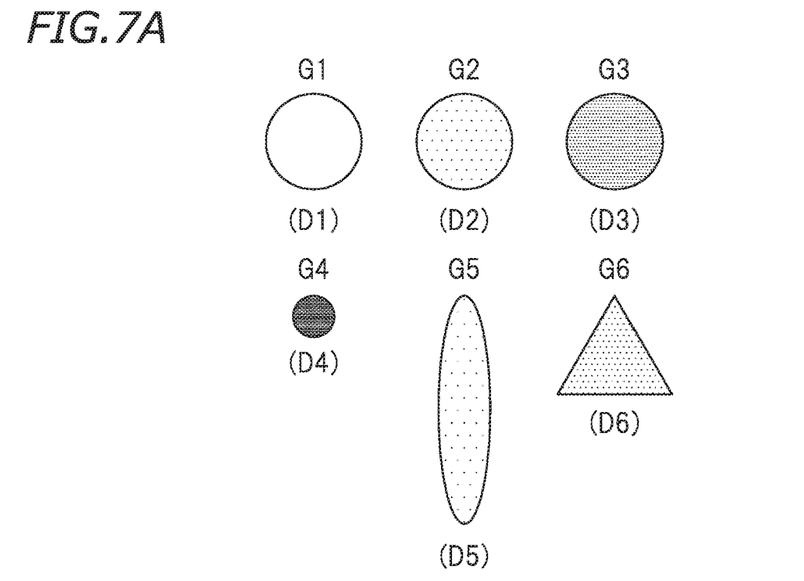
FIG. 7A shows a visual representation of a plurality of images according to a preferred embodiment of the present invention.

At step S1, the image data acquirer 10 acquires sets of image data corresponding to a plurality of images each of which is a recording target. Typically, image data representing one image may be contained in one image data file. The image data acquirer 10 may acquire, for example, two or more sets of image data accommodated in two or more image data files. In this acquisition of image data, for example, it is possible that when the user selects, among a plurality of images, two or more images as the recording targets, the image data corresponding to the selected images may be stored as the image data to be acquired. The format of the image data is not limited to a particular format, and the image data may be, for example, a data file recorded in a format such as PDF format, EPS format, and JPEG format. The acquired image data and the information related to its attributes (information such as the file name and the identification number) may be stored in, for example, a memory or storage, not shown in the drawings. In association with step S1, the number of sets of acquired image data may be stored in the memory or storage. In the present preferred embodiment, six images G1 to G6 shown in FIG. 7A are selected as the recording targets, for example. Thus, the number N of the image data sets is 6, for example. Accordingly, the number N of image data sets, and image data set identification numbers D1 to D6 corresponding to the images G1 to G6, may be stored in the memory or storage in association with the image data sets corresponding to the images that are the recording targets.

Figure 6A:
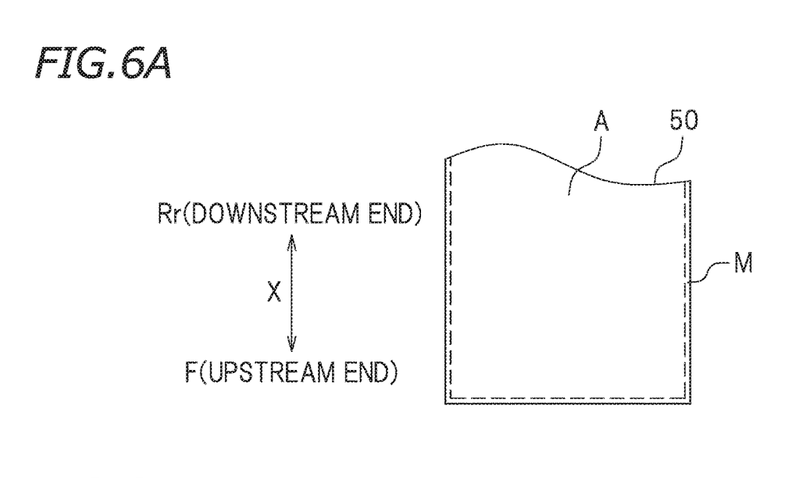
FIGS. 6A to 6C are views illustrating how an image is arranged according to a preferred embodiment of the present invention.

In step S2, the medium information acquirer 20 acquires medium information including a recording area A concerning a recording medium 50. The recording area A may include information concerning the shape and dimensions of the recordable area, in which recording with the inkjet printer system 100 is possible, of the recording surface of the recording medium 50. The recording area may be either the entire recording surface of the recording medium 50 or a portion thereof. For example, as illustrated in FIG. 6A, the recording area A typically may be an area of the entire surface of the recording medium 50 that excludes a peripheral margin M. The margin M may be an area that is used to convey the recording medium 50, or an area in which recording with the recorder 40 is impossible. It should be noted that, depending on the type of the recorder 40, such a margin may not be necessary. In that case, it is possible that the entire recording surface may be set to be the recording area A. In addition to the information concerning the recording area A, the medium information may include, but may not be limited to, information concerning the material of the recording medium 50. Such information concerning the material may include, for example, whether the recording medium 50 is a coated paper or a non-coated paper and whether or not it is a recording medium treated with a surface treatment, such as provision of an ink reception layer, for enhancing suitability for inkjet recording (for example, whether or not it is an inkjet printing paper) and the grade of such a treatment. The acquired medium information may be stored in, for example, a memory or storage, not shown in the drawings.

In step S3, the output data generator 30 generates a set of output data that enables the recorder 40 to output, by combining the two or more sets of image data acquired by the image data acquirer 10. At that time, the output data generator 30 may convert each of the two or more sets of image data in a given format into output data in a format compatible with inkjet printing, such as bitmap format. Then, the output data generator 30 may combine the converted two or more sets of image data into one set of output data. One output image file may be typically created based on two or more image files. In this case, when two or more images are recorded on the recording medium 50, the output data generator 30 arranges the two or more images appropriately so as not to be out of the recording area A and not to be superposed on each other. Such output data may be generated by utilizing a known layout function or a RIP function having a nesting function. The generated output data may be stored in, for example, a memory or storage, not shown in the drawings.

In the generation of output data according to the present preferred embodiment herein, the two or more images are appropriately arranged in the recording area A so as to reduce the required time from when the recorder 40 starts to record the first one of the images to when the last one of the images dries up. Based on such an arrangement of the images, the output data are generated. Such an arrangement of the images may be carried out, for example, in accordance with the procedure shown in the flow-chart of FIG. 5.

Figure 5:
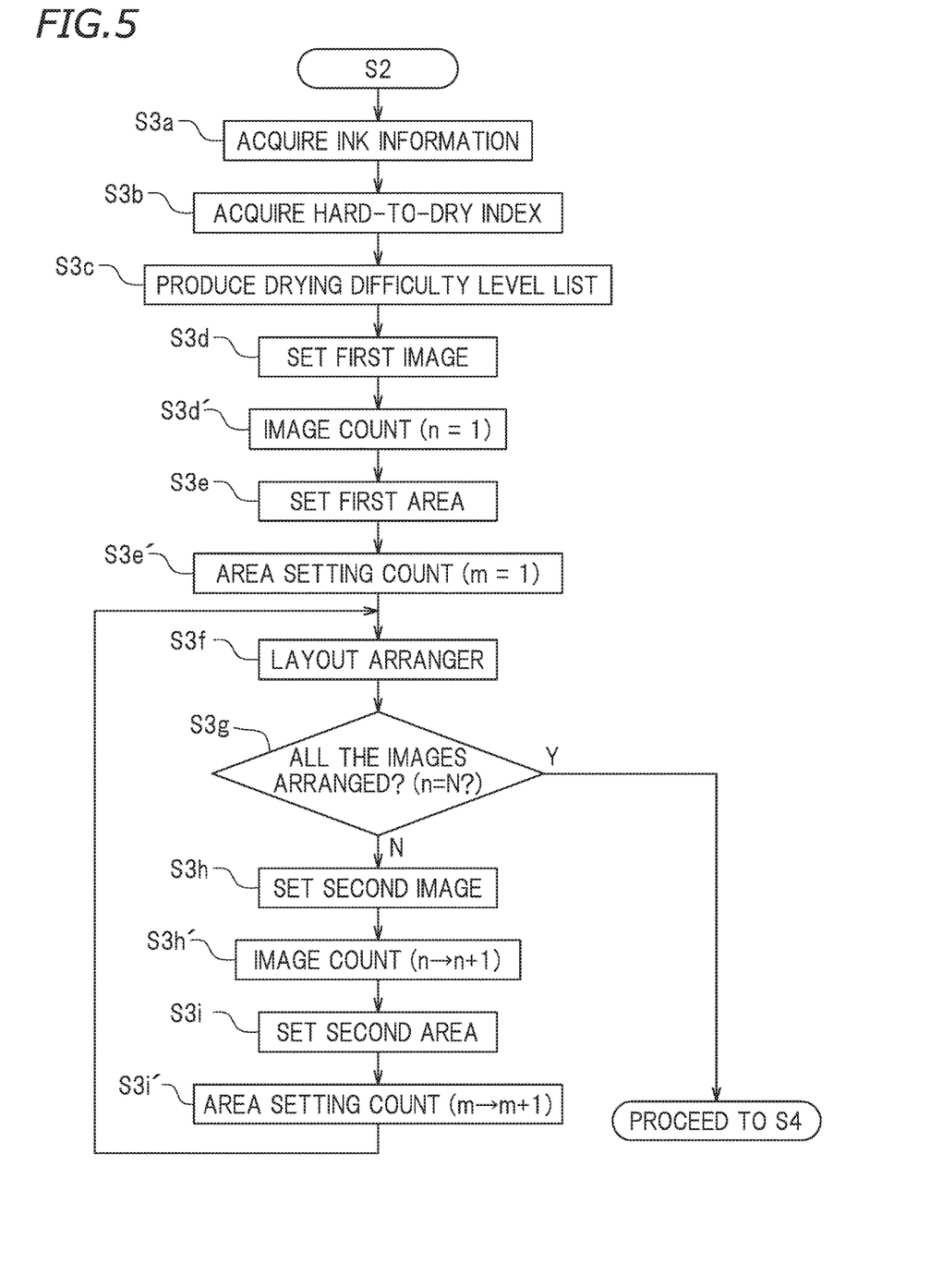
FIG. 5 is a flow-chart illustrating details of step S3 in FIG. 1.

Note that it is not always necessary to carry out steps S3$c$, S3$d'$, S3$e'$, and S3$g$ to S3$i'$ shown in FIG. 5, and these steps may be optionally carried out as necessary. Moreover, the order in which steps S3$a$ to S3$d$ and S3$e$ of FIG. 5 are carried out is not limited. The order in which steps S3$h$ and S3$h'$ and steps S3$i$ and S3$i'$ are carried out is not limited either. Any one of steps S3$a$ to S3$d$ and S3$e$ may be carried out earlier than the other ones, or these steps may be carried out at the same time. Either steps S3$h$ and S3$h'$ or steps S3$i$ and S3$i'$ may be carried out earlier than the other ones, or they may be carried out at the same time. However, it is generally preferable that steps S3$a$ to S3$i'$ be carried out in the order shown in the flow-chart.

As illustrated in FIG. 4, for example, the output data generator 30 may include an ink information acquirer 31, a hard-to-dry index acquirer 32, a first image setter 33, a first area setter 35, a second area setter 36, a layout arranger 37, and an image rotator 38.

In step S3$a$, the ink information acquirer 31 acquires, for each of the two or more images selected by the user, ink information of the ink used to record the image. The ink information may include the amount of ink required to record image data. The ink information may also include other information such as the type of ink. The information concerning the amount of ink may be acquired for each of the types of inks. The acquired ink information for each of the images may be stored in, for example, a memory or storage, not shown in the drawings.

The amount of ink required to record the image may be acquired, for example, in the following manner. Specifically, the output data generator 30 converts the image data into a bitmap format, for example, which can be read by the inkjet-type recorder 40, as described above. Such data conversion is carried out according to the configuration of an ink ejection mechanism (typically a later-described ink head 41) of the recorder 40, or the resolution specified by the user. Accordingly, the size (i.e., volume) and number of the ink droplets used to record an image can be acquired in association with the data conversion of each of the images. For example, the amount of ink used to record an image can be obtained based on the product of the size of each ink droplet and the number of the ink droplets. Based on the ink amount thus obtained, it is possible to determine how difficult a recorded image is to dry.

Figure 7B:
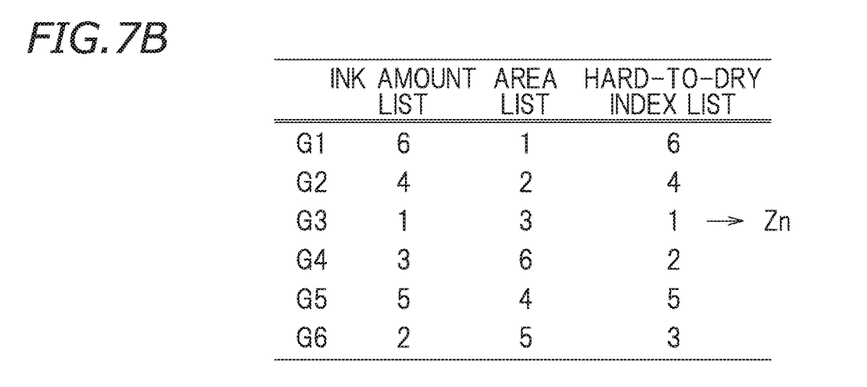
FIGS. 7B and 7C are examples of the lists produced for arranging the images shown in FIG. 7A.

The ink amounts may be listed in an ink amount list in which numbers are assigned to the images in descending order of their required ink amount, for example, as illustrated in FIG. 7B, and stored in a memory or storage, not shown in the drawings. It should be noted that when there are images with the same ink amount, it is possible to set a rule such that, for example, one of the images with a smaller identification number should be assigned to a higher rank.

In step S3$b$, the hard-to-dry index acquirer 32 acquires, for each set of the image data acquired by the image data acquirer 10, a hard-to-dry index calculated from the ink information and indicating how difficult the ink is to dry, based on the ink information acquired by the ink information acquirer 31. For example, it is understood that the higher the hard-to-dry index is, the more difficult the print image is to dry.

Hard-To-Dry Index 1

For the hard-to-dry index, it is possible to use, for example, the required amount of ink that is used when recording an image based on image data. When this is the case, the ink amount information included in the ink information acquired by the ink information acquirer 31 may be used as the hard-to-dry index (hard-to-dry index 1). When a plurality of inks are used to record images, it is possible to use the total amount of the inks as the hard-to-dry index. The hard-to-dry index for each of the images obtained in this manner may be stored in, for example, a memory or storage, not shown in the drawings.

Hard-To-Dry Index 2

Depending on the images selected by the user, it is possible that the size (area) of the image may vary greatly from one image to another. In such a case, the drying difficulty levels of the recorded images may not be compared with each other based merely on the required amounts of ink used to record the images. For that reason, the hard-to-dry index may be replaced with an ink amount per unit area of the image, which is obtained by dividing the required ink amount for each of the images by the area of that image (hard-to-dry index 2). This preferably eliminates fluctuation in the hard-to-dry index originating from differences in image size. The areas of the respective images may be listed in an area list in which numbers are assigned to the images in descending order of their area, for example, as illustrated in FIG. 7B, and stored in a memory or storage, not shown in the drawings.

Hard-To-Dry Index 3

Furthermore, depending on the images selected by the user, it is possible that one image may contain locations where the ejected ink is easy to dry and locations where the ink is difficult to dry. In other words, it is possible that an image to be recorded may contain a location with a higher ink density and a location with a lower ink density. The ink drying difficulty level for a recorded image can be determined by the location where the ink is most difficult to dry. For this reason, in such a case, the drying difficulty level of a recorded image may not be evaluated based merely on the amount of ink per unit area of the image. Accordingly, the hard-to-dry index may be obtained by dividing each of the images into a plurality of sections, obtaining ink amounts per unit area of the divided sections, and using the greatest one of the ink amounts per unit area as the ink amount per unit area of that image (hard-to-dry index 3). This is preferable because the hard-to-dry index serves to extract one of the images containing the portion that is most difficult to dry. The data of the greatest ink amounts per unit area of the divided image portions of the images may be listed in a divided image ink amount list, in which numbers are assigned to the images in descending order of their ink amount per unit area of the divided images, for example, and stored in a memory or storage, not shown in the drawings.

Hard-To-Dry Index 4

The above-described hard-to-dry indices 1 to 3 can well represent how difficult the ink is to dry when images are printed with the same ink. However, different inks may have varied levels of how easy they are to dry, depending on their compositions. For example, in the case of pigment ink, after the ink lands on the recording medium 50, the pigment that is the colorant remains on the surface of the recording medium 50 and only the dispersion medium infiltrates into the recording medium 50. On the other hand, in the case of dye ink, after the ink lands on the recording medium 50, both the solvent and the pigment that is the colorant infiltrate into the recording medium 50. For this reason, the dye ink may require a longer time than the pigment ink from when recording starts to when the ink is stably fixed. Moreover, even when the inks are of the same type, either dye ink or pigment ink, special color inks such as white, metallic colors, pastel colors, and florescent colors are generally more difficult to dry than process color inks, such as cyan (C), magenta (M), yellow (Y), and black (B). Furthermore, even when the inks are of the same color, their drying characteristics may vary depending on the differences in the compounds used as the colorant or the solvent. Therefore, in the technology disclosed herein, the ink information may include data concerning the type of ink. In addition, the data concerning the type of ink may contain data indicating how difficult the ink is to dry.

Such data indicating how difficult an ink is to dry may be, for example, a relative required drying time ratio with respect to a certain ink. Specifically, for example, the ratio of the required drying time of an ink with respect to the required drying time of the reference ink, which is set to 1, may be used as an index indicating how difficult the ink is to dry. Such an index may be set as follows. For example, when cyan (C) is used as the reference (index "1"), the index of magenta is set to "2," the index of yellow (Y) to "2", the index of black (B) to "3", the index of silver to "10", and the index of white to "20". The use of such indices enables the hard-to-dry index to be calculated taking into account how difficult the ink is to dry based on the type of ink (hard-to-dry index 4).

Thus, in the present preferred embodiment, it is possible to take into account how difficult the ink to be used is to dry in addition to the above-described hard-to-dry indices 1 to 3, which are based on the ink amount. In other words, when evaluating the drying difficulty level for an image, the drying difficulty level may be weighted by the drying difficulty level based on the composition of the ink, in addition to the drying difficulty level based on the ink amount. Specifically, the hard-to-dry indices 1 to 3 are calculated based on the information concerning ink amount, such as the required ink amount, the required ink amount per unit area, and the required ink amount per unit area of divided image portion. So, one of the hard-to-dry indices 1 to 3 is calculated for each of the inks to be used, and the calculated hard-to-dry index is multiplied by the required drying time of the corresponding ink, to obtain a weighted average, which is used as a hard-to-dry index 4. For example, it is possible to use, as the hard-to-dry index 4, an arithmetic mean value of the products obtained by multiplying the ink amounts of different types of inks, contained in the ink information acquired by the ink information acquirer 31, by the above-described indices indicating the drying difficulty levels of the respective types of inks.

Figure 7C:
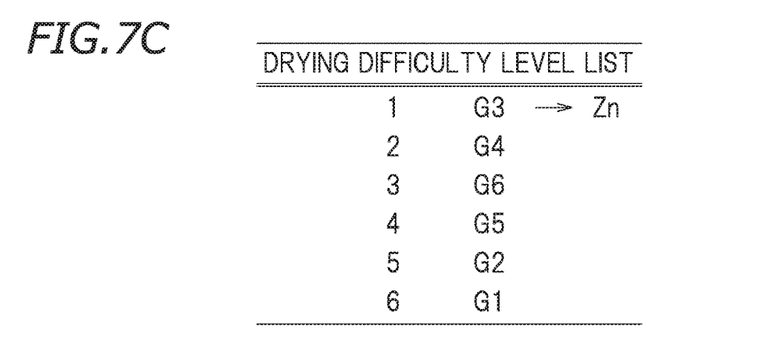

In step S3$d$, the first image setter 33 sets one of the images with the highest hard-to-dry index among the hard-to-dry indices acquired by the hard-to-dry index acquirer 32, to be a first image Zn. In step S3$c$ prior to step S3$c$, the first image setter 33 may create a "drying difficulty level list" in which the images are ranked in descending order of their drying difficulty level. The "drying difficulty level list" may be a hard-to-dry index list in which numbers are assigned to the images in descending order of their hard-to-dry index, for example as shown in FIG. 7B. Alternatively, the drying difficulty level list may be a hard-to-dry index list in which two or more images are sorted based on their hard-to-dry index and the images are listed in descending order of hard-to-dry index, for example as shown in FIG. 7C. This drying difficulty level list enables the first image setter 33 to recognize that drying time should be preferentially provided for the images in the listed order (i.e., in descending order of hard-to-dry index). Accordingly, when the list of FIG. 7 is created, the first image setter 33 should set the image G3, which is listed at the top of the drying difficulty level list (i.e., the image with a number of 1), to the first image Zn. The drying difficulty level list thus produced may be stored in, for example, a memory or storage, not shown in the drawings. Note that when the first image Zn is set initially (i.e., for the first time) among the selected plurality of images, number "1" may be stored as an image count n in step S3$d'$. Here, n is a natural number.

In addition, when there are images with the same hard-to-dry index in creating the drying difficulty level list, it is possible to set a condition more suitable for the purpose, in assigning numbers to the images. Examples of such conditions include: (a) assigning an image having a larger maximum image size to a higher rank in the list; (b) assigning an image having a larger image area to a higher rank in the list; and (c) assigning an image that requires a larger amount of ink to record the image to a higher rank in the list. For example, in FIG. 7A, the image G3 and the image G4 have the same hard-to-dry index based on their ink amount per unit area. However, it is preferable the image G3, which has a larger size and is accordingly more difficult to arrange, should be arranged more preferentially and earlier than the image G4. For that reason, in this case, one of the above conditions (a) to (c) should be used so that the image G3 is listed at a higher rank than the image G3.

Figure 6B:
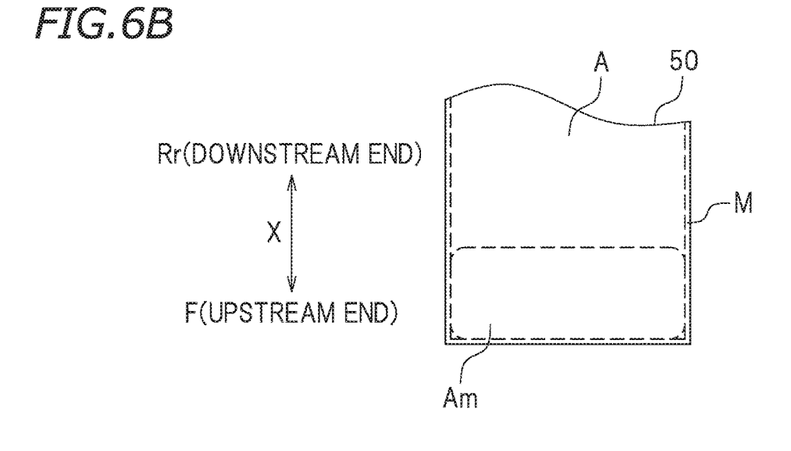

In step S3$e$, the first area setter 35 sets a first area Am in an upstream region (which is toward the end in which printing is carried out earlier) in a recording area A of the recording medium 50, that is upstream in a conveying direction, as illustrated in FIG. 6B. When recording is carried out with the recorder 40 in the present preferred embodiment, the recording medium 50 is conveyed consecutively from the rear to the front. Since the direction in which the recording medium 50 is conveyed is defined as the sub-scanning direction X, the front-to-rear/rear-to-front direction corresponds to the sub-scanning direction X while the left-to-right/right-to-left direction corresponds to the main scanning direction Y in this example. The sub-scanning direction X and the main-scanning direction Y intersect. In addition, the sub-scanning direction X and the main scanning direction Y are orthogonal to each other in this example. This first area Am is the area of the recording area A that ensures the longest drying time after recording. In FIG. 6B, the front is upstream, so the first area setter 35 may set an area including the front end portion of the recording area A to be the first area Am. The proportion of the first area Am with respect to the recording area A is not limited. The first area Am may be, for example, equal to or greater than several times (for example, 2 to 4 times) the average area of the images to be recorded, although it may depend on the dimensions of the recording medium 50 and the dimensions and shapes of the images that are the recording targets. In the present preferred embodiment, the image G3 is already set to be the first image Zn by the first image setter 33 in the foregoing step S3$d$. The first area setter 35 may acquire the size data of the image G3, which is the first image Zn, and set the first area Am in a size such that the first area Am can completely accommodate the image G3. The information concerning the first area Am may be stored in, for example, a memory or storage, not shown in the drawings. Additionally, when the area Am is set initially (i.e., for the first time) for the recording area A, number "1" may also be stored as an area setting count m at step S3$e'$. Here, m is a natural number.

Figure 6C:
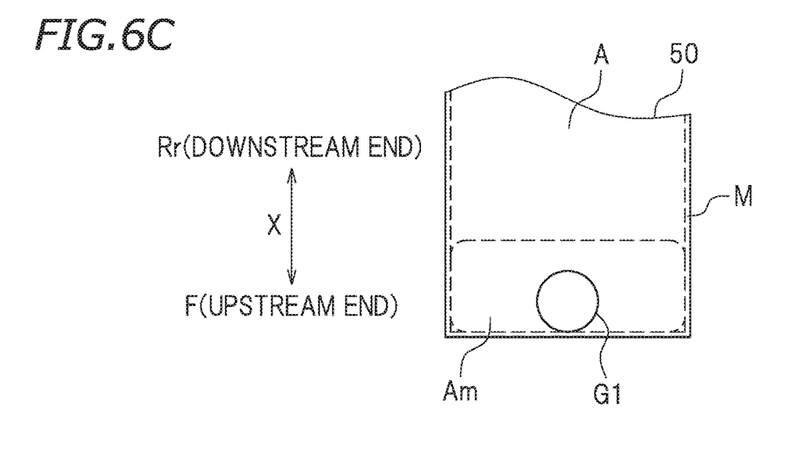

In step S3$f$, the layout arranger 37 arranges the first image Zn that is set by the first image setter 33 in the first area Am that is set by the first area setter 35 earlier than the images other than the first image Zn, as illustrated in FIG. 6C. This enables the first image Zn to be reliably arranged in the first area Am. In other words, the image Zn, which is most difficult to dry, is able to be arranged in the first area Am, that ensures the longest drying time. Thus, the first image Zn, which is most difficult to dry, is able to be dried in a suitable manner. As a result, the required time is equal or reduced in comparison with the case where the first image Zn is not arranged in the first area Am.

The position of the first image Zn in the first area Am is not limited in any way. The entirety of the first image Zn may be arranged in the first area Am, or at least a portion of the first image Zn may be arranged in the first area Am. Even when some portion of the first image Zn does not fit within the first area Am, that portion is arranged in an adjacent area to the first area Am. Therefore, drying of the first image Zn is able to be facilitated in comparison with the case where the first image Zn is arranged in an area away from the first area Am.

Nevertheless, it is preferable that the first image Zn should be provided with the longest drying time. From such a viewpoint, it is preferable that a greater portion of the first image Zn be arranged within the first area Am. Moreover, it is preferable that the first image Zn be arranged in a more upstream portion of the first area Am. For example, it is preferable that the first image Zn be arranged so that the most upstream end position of the first area Am is at a same position or is closest to, the most upstream end position of the first image Zn.

The output data generator 30 may check whether or not there are remaining images to be arranged each time an image is arranged (S3g). For example, whether or not the image count is "n=N" should be determined. If there is no more image to be arranged (n=N), it is determined that arrangement of all the images is completed, and output data are produced by combining the respective sets of the image data according to the arrangement of the images. If there are remaining images to be arranged (n<N), the remaining images should be arranged. The way of arranging the remaining images is not limited in any way. For example, the remaining images may be arranged with the use of a known nesting function so that the required amount of the recording medium 50 is able to be significantly reduced or minimized. However, in order to reduce the required time more reliably, it is preferable that the remaining images also be arranged taking drying time into account, for example, according to the following procedure.

In step S3h, the second image setter 34 sets, among the remaining images, an image having the highest hard-to-dry index to be the first image Zn anew. In this step, when it is the n-th time that the image arrangement is carried out, the n-th image (the image with a number of n) in the drying difficulty level list should be set to be the first image Zn. For example, when it is the second time that the image arrangement is carried out, the image G4, which is the second image (the image with a number of 2) in the drying difficulty level list should be set to be the first image Zn.

Note that when setting of the first image Zn is carried out again, number "n+1" may also be stored as the image count n at step S3h'.

In step S3i, the second area setter 36 sets an area A' that is within the recording area A other than the area in which the first image Zn is arranged, to be the recording area A anew. Then, for this recording area A, a first area Am is newly set in an upstream area that is upstream in the conveying direction, which is the sub-scanning direction X. This first area Am is the area of the recording area A that ensures the longest drying time after recording. The way of setting the first area Am for the recording area A is not limited. In the present preferred embodiment, the image G4 is newly set to be the first image Zn by the second image setter 34 in the foregoing step S3h. The second area setter 36 may acquire the size data of the image G4 and set the first area Am in such a size that the first area Am can completely accommodate the image G4. The information concerning the first area Am may be stored in, for example, a memory or storage, not shown in the drawings. Note that when the setting of the first area Am is carried out again, number "m+1" may also be stored as the area setting count m at step S3i'.

After the setting of the first image Zn for the n-th time and the setting of the first area Am for the m-th time are carried out in this way, step S3f is carried out again, in which the layout arranger 37 arranges the first image Zn that is set by the second image setter 34 in the first area Am that is set by the second area setter 36 earlier than the images to be arranged other than the first image Zn. This enables the first image Zn set for the n-th time to be reliably arranged in the first area Am. For example, it is possible to arrange the image G4, which is the first image Zn set for the second time, reliably in the first area Am. Thereafter, steps S3f to S3i' may be repeated until there is no more image to be arranged. This enables all the images to be arranged in a suitable manner taking ink drying time into account.

Figure 8:
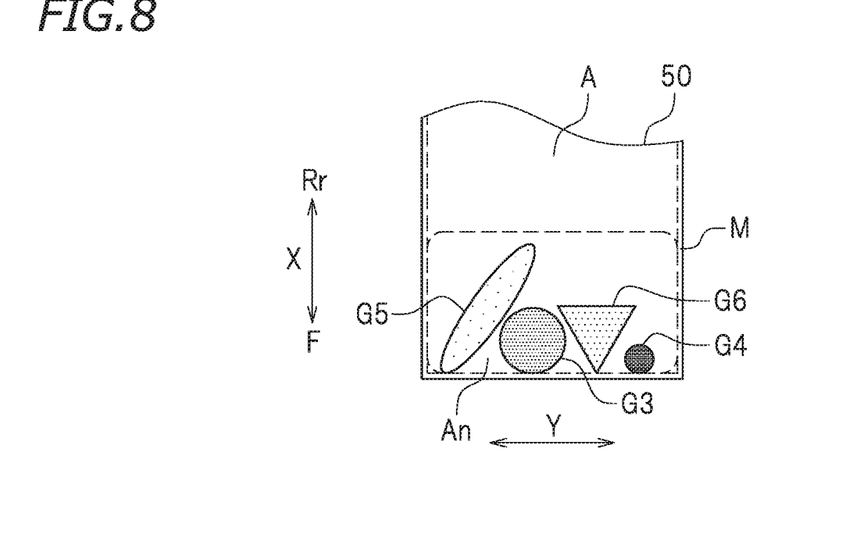
FIG. 8 is a view illustrating a visual representation of how a plurality of images are arranged according to a preferred embodiment of the present invention.

It should be noted that when images are arranged by the layout arranger 37, the images may be arranged in a rotated condition, such as the images G5 and G6 shown in FIG. 8. Such rotation of image data may be carried out by the image rotator 38. The image rotator 38 can produce post-rotation image data, in which given image data are rotated at a predetermined rotation angle.

The image G6 contains, for example, a portion with a higher ink density and a portion with a lower ink density. It is preferable that the hard-to-dry index of such an image G6 be determined based on the portion with a higher ink density. Moreover, it is preferable that the image G6 be arranged so that its portion with a higher ink density is arranged in an upstream region, that ensures a longer drying time. Accordingly, when such an image G6 containing a portion with a higher ink density and a portion with a lower ink density is selected, each of the images is divided into a plurality of sections, then the hard-to-dry index values are calculated for the respective divided sections, and the highest one of the hard-to-dry index values may be used as the hard-to-dry index of the image. In addition, when arranging the image G6, the image rotator 38 may rotate and arrange the image G6 within the recording area A so that the section thereof having the highest hard-to-dry index value is located as close as possible to the upstream end. As a result, the portion of an image that is most difficult to dry is able to be arranged in a location that ensures a longer drying time.

In addition, the image G6, for example, may contain a portion with a higher ink density and a portion with a lower ink density in various sections thereof. For such an image G6, the image rotator 38 may obtain the required time from printing to drying in each of the cases where the image is rotated at several different rotation angles, and may rotate the image at the rotation angle, that is a quick drying rotation angle, at which the required time is the shortest. The rotation pitch to rotate the image to determine the quick drying rotation angle may be an arbitrary angle preferably represented by the following general formula: 360/n, where n is a natural number of 2 or more. Where, n is preferably 2 or more, more preferably 3 or more, and particularly preferably 4 or more, for example. Preferably, n is 72 or less, more preferably 36 or less, further preferably 18 or less, particularly preferably 12 or less, for example. The rotation pitch may preferably be, for example, 20°, 30°, 45°, 60°, 72°, 90° or 120°. For example, the image is rotated at 12 different angles every 30°, namely 0°, 30°, 60°, . . . , and 330°, and for each of the images arranged in the rotated conditions, the required time from the start of printing to the completion of drying is calculated. Then, the image rotator 38 identifies the quick drying rotation angle at which the required time is the shortest, and the image rotator 38 is able to rotate and arrange the image G6 within the recording area A at that quick drying rotation angle. As a result, an image is arranged with the orientation of the image adjusted so as to significantly reduce or minimize the required time.

Moreover, for example, the image G5 has high shape anisotropy. Such an image G5 may result in a greatly varying dimension along the sub-scanning direction X in the recording medium 50, depending on its orientation (i.e., angle). In other words, the required amount of the recording medium 50 may be influenced significantly by the way of arranging the image G5. For this reason, when the images include such an image G5 with high shape anisotropy and also include an image G2 with the same hard-to-dry index as that of the image G5, the image G5 with higher shape anisotropy should be placed at a higher rank in the drying difficulty level list, as already described previously. Then, the image rotator 38 may arrange the image G5, which has high shape anisotropy, by rotating the image G5 within the recording area A so that its dimension along the sub-scanning direction X can be as small as possible. Thus, the amount of the recording medium 50 used is able to be reduced while taking the drying time into account.

The method for evaluating the shape anisotropy of the image is not limited to any particular method. The shape anisotropy may be evaluated, for example, using the aspect ratio of the image. The aspect ratio is calculated based on the ratio (a/b) of the length (a) of the long side to the length (b) of the short side of a rectangle circumscribed around the target image when the area of the circumscribed rectangle is minimum with respect to the image. It is evaluated that the greater the aspect ratio is, the higher the shape anisotropy of the image is.

In step S4, the recorder 40 records a recording target on the recording medium 50 based on the output generated by the output data generator 30.

As illustrated in FIG. 3, the recorder 40 essentially includes ink heads 41, a carriage mechanism 42, and a controller 43. In the present preferred embodiment, all of the ink heads 41, the carriage mechanism 42, and the controller 43 are accommodated in the casing 44 of the recorder 40.

The carriage mechanism 42 moves the ink heads 41 in left-to-right/right-to-left directions, which are the main scanning directions Y. The carriage mechanism 42 of this example includes a guide rail 45 disposed in a casing 44 and extending laterally, a carriage 46 slidably engaged with the guide rail 45 and carrying the ink heads 41, and a driving mechanism 47 connected to the carriage 46 and causing the carriage 46 to move along the guide rail 45. Although the configuration of the driving mechanism 47 is not limited to the following, the driving mechanism 47 of the present preferred embodiment is, for example, a transmission-carriage mechanism including two pulleys 47a and 47b, a timing belt 47c wrapped around the pulleys 47a and 47b, and a motor 47d connected to one of the pulleys 47a and rotating the pulley 47a. The carriage 46 is secured to the timing belt 47c. As the motor 47d rotates in a forward direction or in a reverse direction, the pulley 47a rotates accordingly, causing the timing belt 47c to move around the pulleys 47a and 47b in a forward direction or in a reverse direction. As a result, the carriage 46 moves leftward or rightward along the guide rail 45. The recorder 40 is provided with a media holder (not shown) to freely hold and feed the long recording medium 50 wound into a roll shape and a conveyor 48 that conveys the recording medium 50 along a conveying path, and the casing 44 is provided with a recording medium ejection port 44a (see FIG. 1) that ejects the recording medium 50. The conveyor 48 feeds the recording medium 50, which is retained by the media holder, underneath the guide rail 45, to supply the recording medium 50, and ejects the recorded recording medium 50 out of the casing 44 through the recording medium ejection port 44a.

In the present preferred embodiment, a plurality of ink heads 41 are mounted on the carriage 46. Although the number of ink heads 41 mounted on the carriage 46 is not limited in any way, five ink heads 41 are mounted on the carriage 46 in the present preferred embodiment, for example. The ink heads 41 respectively eject five colors of ink, cyan (C), magenta (M), yellow (Y), black (K), and white (W). As mentioned previously, it is also possible to provide an ink head capable of ejecting a special color ink, such as metallic color, pastel color, and florescent color. The number of carriage 46 is not limited to one, and it is possible to provide a plurality of carriages 46 (for example, two, three, or four or more).

The controller 43 executes various control operations for the recorder 40. The controller 43 controls, for example, the behaviors of the ink heads 41 and the carriage mechanism 42. In the present preferred embodiment, the controller 43 is constructed by, for example, a computer processor. The hardware configuration of the computer processor is not limited in any way. For example, the computer processor may include an interface (I/F) receiving print data or the like from external apparatuses such as a host computer, a CPU executing print control program instructions, a read only memory (ROM) storing a program executed by the CPU, a random access memory (RAM) used as a working area to deploy the program, and a data storage storing various data such as the print control program. The CPU may be a CPU common to the one provided for the inkjet printer system 100 or may be another CPU. The controller 43 is communicatively connected to the output data generator 30. The controller 43 may be communicatively connected to the output data generator 30 either by a wire or wirelessly. The recorder 40 causes the ink heads 41 and the carriage mechanism 42 to operate based on the output data generated by the output data generator 30 so that the recorder 40 is able to record a plurality of images.

As described above, the present preferred embodiment records a plurality of images, taking into account the ink drying difficulty level of each of the images, in such a manner that one of the images in which the ink is most difficult to dry is arranged preferentially in the area that ensures the longest drying time. The ink drying difficulty level is calculated quantitatively based on the amount of ink required to record each of the images. As a result, a longer drying time is ensured for the one of the images for which the ink is most difficult to dry. Therefore, it is possible to reduce the time from when the first one of a plurality of images starts to be recorded to when the last one of the images dries up.

Moreover, in the present preferred embodiment, the remaining images are arranged from one to another likewise, in such manner that one that is more difficult to dry is arranged preferentially in an area that ensures a longer drying time. This reduces the time required to record and drying a plurality of images more reliably.

In a preferred embodiment of the present invention, when evaluating the ink drying difficulty level of each of the images, the ink drying difficulty level based on the types of inks to be used is taken into consideration, in addition to the ink amount. As a result, when a plurality of inks are used to record images, the ink drying difficulty levels for the images are evaluated more appropriately. Therefore, it is possible to more appropriately identify the image that should be dried preferentially.

In a preferred embodiment of the present invention, the ink drying difficulty level of each of the images is evaluated based on the ink amount per unit area of the image. As a result, even when the plurality of images have different sizes, the ink drying difficulty levels for the images are evaluated more appropriately. Thus, it is possible to more appropriately identify the image that should be dried preferentially.

In a preferred embodiment of the present invention, the ink drying difficulty levels for the images are evaluated based on the ink amount per unit area that is obtained by dividing each of the images into a plurality of sections and obtaining an ink amount per unit area of each of the sections. In addition, when one image contains portions that are difficult to dry and portions that are easy to dry, the ink drying difficulty level of the image is evaluated based on the portion that is most difficult to dry. Thus, such an image that is difficult to dry in some portions thereof may also be identified as an image that should be dried preferentially.

In a preferred embodiment of the present invention, when an image contains a portion that is difficult to dry and a portion that is easy to dry, the image is rotated and arranged so that the portion of the image that is most difficult to dry can be located in an area that is easier to dry. Thus, within one image, a longer drying time is provided for the portion that is difficult to dry, rather than the portion that is easy to dry. This is especially effective when recording a large-sized image.

Figure 9A:
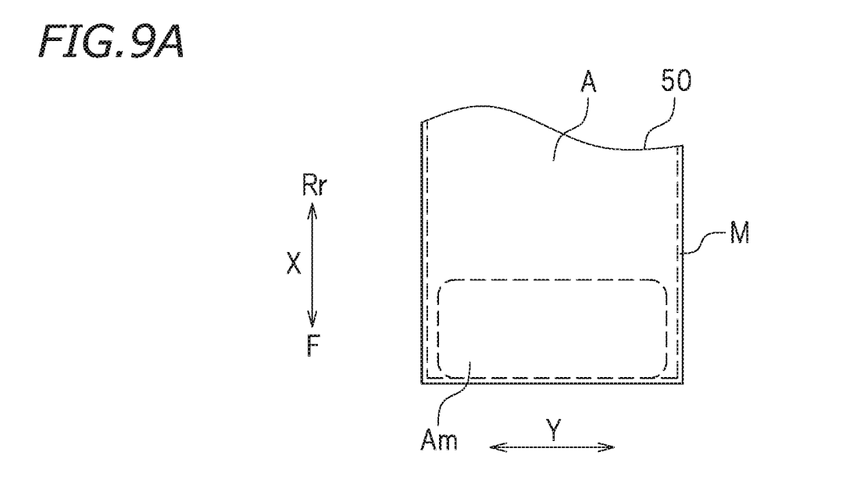
FIG. 9A is a view for illustrating one way of setting a first area Am.

It should be noted that in the foregoing preferred embodiments, the first area Am preferably is set to be in an upstream portion of the recording area A that is upstream in the conveying direction X of the recording medium 50. Here, for example, when the recorder 40 carries out bidirectional recording, the controller 43 controls the ink heads 41 so as to cause the ink heads 41 (or the carriage 46) to move in one direction and in the other direction along the main scanning direction Y and simultaneously cause the ink heads 41 to eject ink for both directions during the time the ink heads 41 are moving. In that case, the ink ejection timing from the ink heads 41 onto the recording medium 50 varies at various points on a line along the main scanning direction, causing variations in ink ejection timing. In addition, in the recording area A of the recording medium 50, the time from when the ink heads 41 passes through a center along the main scanning direction Y in one direction to when the ink heads 41 passes through the center again in the other direction is long. On the other hand, the time from when the ink heads 41 passes through a point on the line along the main scanning direction Y in one direction to when the ink heads 41 passes through the point again in the other direction gradually reduces from the center toward either of the edge portions along the main scanning direction Y. In other words, the ink may be supplied in a greater amount within a shorter time when the ink heads 41 are closer to the edge portions than when they are closer to the center of the main scanning direction Y. Therefore, the edge portions may be in such an environment in which the ink is more difficult to dry, even when the edge portions are near the upstream end in the sub-scanning direction X. This tendency may be more significant when the recording medium 50 has a larger dimension (i.e., width) along the main scanning direction Y. For example, when the width of the recording medium 50 exceeds 1 m, the difference may appear clearly. In view of this, in the technology disclosed herein, when, for example, the recorder 40 carries out bidirectional recording, the first area setter 35 may set lateral end portions of the recording direction (main scanning direction Y) of the recording area not to be the first area, as illustrated in FIG. 9A. In other words, the edge portions of the recording direction may be excluded from the first area Am even if the edge portions are near the upstream end of the recording area A.

In other words, within the recording area A of the recording medium 50, a region near the center of the moving area of the ink heads 41 (which may also be the carriage 46) along the main scanning direction Y may be an area in which the ink is easier to dry than the regions near the edge portions. Typically, a region of the recording area A of the recording medium 50 that is near the center line dividing the recording area A in half in the main scanning direction Y may be the area in which the ink is easier to dry. In the technology disclosed herein, when, for example, the recorder 40 carries out bidirectional recording, the first area setter 35 may set a region of the recording area A near the center line orthogonal to the main scanning direction Y to be the center of the first area Am with respect to the main scanning direction Y, as illustrated in FIG. 9A. In other words, the first area Am may be set in an area including the center of the recording direction, even when it is near the upstream end of the recording area A.

It should be noted that when the recorder 40 includes a plurality of carriages 46 and the carriages 46 move along the main scanning direction Y in different areas of the recording area A, the first area Am may be provided so as to include a region near the center of each moving area of the carriages 46. In that case, it is possible that the first area Am may not be provided at the center of the main scanning direction Y of the recording area A.

The present preferred embodiment takes into consideration not only the ink amounts required to record images but also the ways of recording the images. Thus, even when the recording is made on the same recording medium 50, the images are appropriately arranged taking into consideration variations in the time that can be spent on drying, variations in the amount of ink to be supplied, and moreover variations in the supply timing of ink, all of which depend on the locations. As a result, the image in which the ink is most difficult to dry is not arranged in the edge portions (hereinafter also referred to as "excluded areas") across the main scanning direction Y, so the image is able to be provided more reliably with an environment in which the ink dries easily after the recording.

Figure 9B:
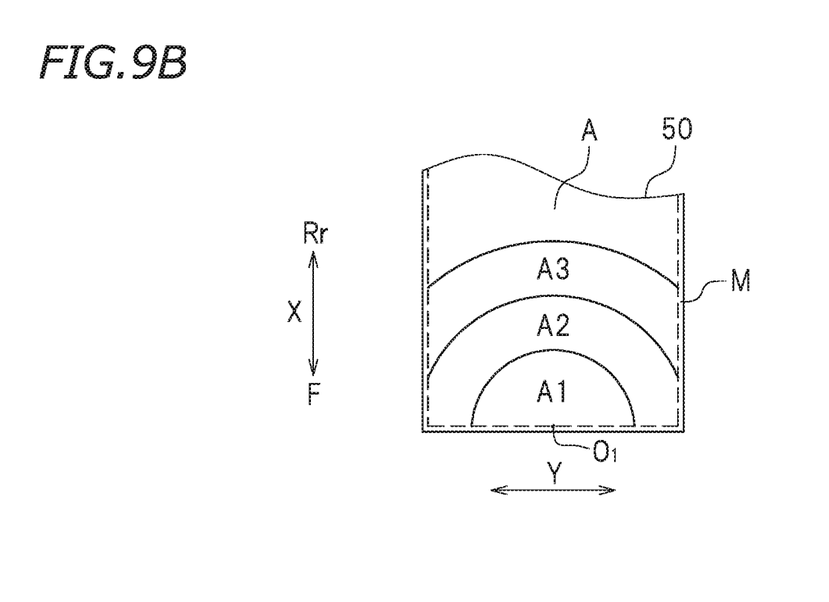
FIG. 9B is a view for illustrating one way of setting a printing area in cases of bidirectional printing.

As described above, when the recorder 40 carries out bidirectional recording, the ink is relatively difficult to dry in the opposing edge portions across the main scanning direction Y. Meanwhile, a portion near the center of the moving area of the ink heads 41 along the main scanning direction Y may be an area in which the ink is easier to dry than the edge portions. Thus, FIG. 9B shows a visual representation of ink drying readiness levels in the recording area A when the recorder 40 carries out bidirectional recording. In FIG. 9B, an area A1 is a semicircular area with its center at a point $O_1$ (origin), which is at the most upstream end of the recording area A in the sub-scanning direction and at the center of the main scanning direction. This area A1 is understood as the area of the recording area A in which the ink dries most easily. An area A2 is a semicircular arc-shaped area centered at the point $O_1$ and provided so as to surround the area A1. The area A2 is understood as the area in which the ink dries the next most easily after the area A1. Likewise, an area A3 is a semicircular arc-shaped area centered at the point $O_1$ and provided so as to surround the area A2. The area A3 is understood as the area in which the ink dries the next most easily after the area A2.

Accordingly, when the recorder 40 carries out bidirectional recording, the recording area A may be divided into a plurality of areas according to the ink drying readiness level in advance, and the first area setter 35 and the second area setter 36 may set an appropriate area to be the first area Am according to the drying difficulty level of the images. For example, the boundaries between the areas A1, A2, and A3 shown in FIG. 9B may be set as the extensions of the first area Am. Thus, when the recorder 40 carries out bidirectional recording, the images are able to be arranged into areas in which the ink is easier to dry, successively from an image at a higher rank in the drying difficulty level list.

Figure 9C:
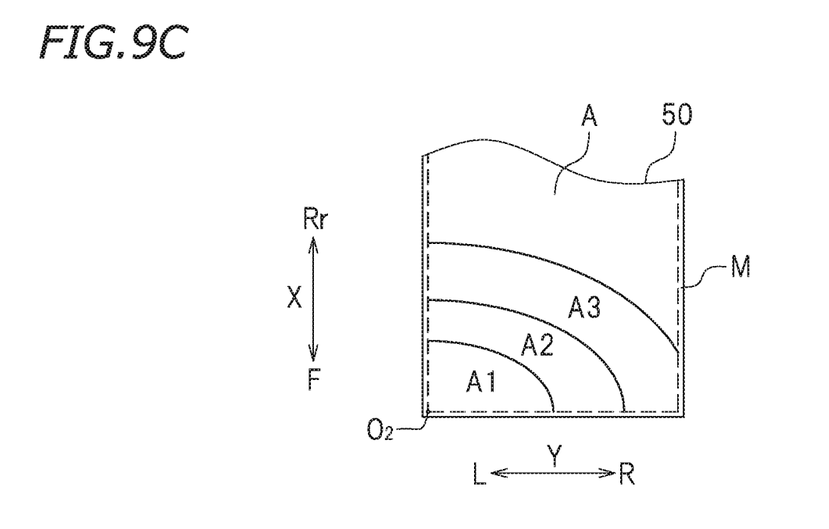
FIG. 9C is a view for illustrating one way of setting a printing area in cases of unidirectional printing.

On the other hand, for example, when the recorder 40 carries out unidirectional recording, the controller 43 controls the ink heads 41 so as to cause the ink heads 41 (or the carriage 46) to move in one direction and in the other direction along the main scanning direction Y and simultaneously cause the ink heads 41 to eject ink only during the time the ink heads 41 is moving in one of the directions. For example, the ink heads 41 eject ink when moving from the left to the right relative to the recording medium 50 shown in FIG. 9C. At this time, in the recording area A of the recording medium 50, ink is successively supplied from the left end to the right end along the main scanning direction Y. This means that the time for drying after the printing gradually reduces from the left end toward the right end along the main scanning direction Y. That is, an environment in which the ink dries more easily is provided in a left end of the main scanning direction Y, and a region nearer to the right end may be an environment in which the ink is more difficult to dry. Thus, in the technology disclosed herein, for example, when the recorder 40 carries out unidirectional recording, the first area setter 35 may set the point $O_2$ that is at the most upstream end of the recording area A in the sub-scanning direction and at the recording start end in the main scanning direction Y to be the reference (origin), and may set the first area Am to include the point $O_2$, as illustrated in FIG. 9C. In other words, the first area Am may be provided in an area including the recording start point $O_2$ of the recording area A.

In FIG. 9C, for example, an area A1 is a semicircular area with its center at a point $O_2$ which is at the most upstream end of the recording area A in the sub-scanning direction and at the recording start end thereof in the main scanning direction. This area A1 is understood as the area of the recording area A in which the ink dries most easily when the recorder 40 carries out unidirectional recording. An area A2 is a semicircular arc-shaped area with its center at the point $O_2$ and provided so as to surround the area A1. The area A2 is understood as the area in which the ink dries the next most easily after the area A1. Likewise, an area A3 is a semicircular arc-shaped area centered at the point $O_2$ and provided so as to surround the area A2. The area A3 is understood as the area in which the ink dries the next most easily after the area A2. Accordingly, when the recorder 40 carries out unidirectional recording, the recording area A may be divided into a plurality of areas according to the ink drying readiness level in advance, and the first area setter 35 and the second area setter 36 may set an appropriate area to be the first area Am according to the drying difficulty level of the images. For example, the boundaries between the areas A1, A2, and A3 shown in FIG. 9C may be set as the extensions of the first area Am. Thus, when the recorder 40 carries out unidirectional recording, the images are able to be arranged into areas in which the ink is easier to dry, successively from one at a higher rank in the drying difficulty level list.

As illustrated in FIGS. 9B and 9C, for example, the areas A1, A2, and A3 may be set to be in circular arc shapes having different radii with their center at the point $O_1$, which is at the most upstream end of the recording area A and at the center of the main scanning direction Y, or at the point $O_2$, which is at the recording start end of the main scanning direction Y. The circular arc mentioned herein may or may not be a circular arc in a geometrically strict sense. For example, such a circular arc may be a portion of a substantially elliptic shape, a portion of an elongated circular shape (i.e., a shape in which a rectangle is sandwiched between semicircles, also called a stadium shape), or a shape that can be generally regarded as these shapes, for example.

In the foregoing preferred embodiments of the present invention, the image data acquirer 10, the medium information acquirer 20, and the output data generator 30 are accommodated in the casing 44 of the recorder 40. However, the image data acquirer 10, the medium information acquirer 20, and the output data generator 30 are not limited to those provided integrally in the recorder 40. The image data acquirer 10, the medium information acquirer 20, and the output data generator 30 may be provided, for example, in an external computer, not shown in the drawings. In that case, the image data acquirer 10, the medium information acquirer 20, and the output data generator 30 may be allowed to be in bidirectionally communication with the recorder 40, for example, via a wired or wireless connection system (including a data communication network). Accordingly, the image data acquirer 10 may acquire image data stored in the external computer, or may acquire, through the external computer, image data stored in a data communication network or in another external computer. Furthermore, various instructions between the image data acquirer 10, the medium information acquirer 20, and the output data generator 30 may be transmitted via the external computer. For example, various processes and functions of the image data acquirer 10, the medium information acquirer 20, and the output data generator 30 may be executed by the external computer, and based on the data processed by the external computer, instructions for output may be transmitted from the external computer to the recorder 40. These instructions may be implemented, for example, using an application for operating any one or more of the image data acquirer 10, the medium information acquirer 20, the output data generator 30, and the recorder 40. This allows the inkjet printer system 100 to be used easily and comfortably, and is therefore preferable.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inkjet printer system comprising:
an image data acquirer that acquires two or more sets of image data concerning images each being a recording target;
a medium information acquirer that acquires medium information including information representative of a recording area concerning a recording medium in which the images are to be recorded;
an output data generator that generates a set of output data by combining the two or more sets of image data such that two or more of the images corresponding to the image data are arranged so as to be in the recording area and not to be superposed on each other; and
a recorder that records the two or more images by ejecting at least one ink onto the recording medium based on the output data while conveying the recording medium in a conveying direction; wherein
the output data generator includes:
an ink information acquirer that acquires, for each of the two or more images, ink information including an amount of ink required to record the image;
a hard-to-dry index acquirer that acquires, for each of the images, a hard-to-dry index calculated from the ink information and indicating how difficult the ink is to dry;
a first image setter that sets one of the images having a highest hard-to-dry index to be a first image;
a first area setter that sets a first area in the recording area of the recording medium, the first area being upstream in the conveying direction; and
a layout arranger that arranges the first image in the first area earlier than any other images;
the hard-to-dry index acquirer calculates the hard-to-dry index based on an amount of ink per unit area of one of the images that is required to record the image; and
the hard-to-dry index acquirer divides each of the images into a plurality of portions, calculates respective hard-to-dry index values for the portions, and uses a highest one of the hard-to-dry index values as the hard-to-dry index of the image data.

2. The inkjet printer system according to claim 1, wherein the output data generator includes:
a second area setter that sets an area of the recording area other than the area in which the first image is arranged, to be a recording area anew; and
a second image setter that sets one of the other images having a highest hard-to-dry index to be the first image anew.

3. The inkjet printer system according to claim 1, wherein the recorder records the images by ejecting a plurality of inks;
the ink information includes information concerning types of inks; and
the hard-to-dry index acquirer calculates the hard-to-dry index taking into account a level of how difficult the ink is to dry based on the types of inks.

4. The inkjet printer system according to claim 1, wherein the layout arranger includes an image rotator that rotates the images within the recording area; and
the layout arranger arranges the first image by rotating the first image so that the portion having the highest hard-to-dry index is located at a most upstream end.

5. The inkjet printer system according to claim 1, wherein the recorder includes:
an ink head that ejects the ink;
a carriage mechanism that causes the ink head to move in a recording direction that intersects the conveying direction; and
a controller that controls a position of the ink head via the carriage mechanism and ejection of the ink via the ink head; wherein
when the controller controls the ink head so as to cause the ink head to move in both of a first direction and a second direction along the recording direction and simultaneously cause the ink head to eject the ink for both the first direction and the second direction, opposing lateral end portions along both the first direction and the second direction of the recording area are not set by the first area setter to be included in the first area.

6. An inkjet recording method comprising:
acquiring sets of image data corresponding to two or more images each being a recording target;
acquiring medium information including information representative of a recording area concerning a recording medium in which the images are to be recorded;
generating output data by combining two or more sets of the image data for the two or more images, so that the two or more images corresponding to the two or more sets of image data are arranged so as to be in the recording area and not to be superposed on each other; and
recording the two or more images by ejecting ink onto the recording medium based on the output data while conveying the recording medium in a conveying direction; wherein
the step of generating output data includes:
acquiring, for each of the two or more images, ink information including an amount of the ink required to record each of the two or more images;
acquiring, for each of the images, a hard-to-dry index calculated from the ink information and indicating how difficult the ink is to dry;
setting one of the images having a highest hard-to-dry index to be a first image;
setting a first area in the recording area of the recording medium, the first area being upstream in the conveying direction; and
arranging the first image in the first area earlier than other images;
in the step of acquiring the hard-to-dry index, the hard-to-dry index is calculated based on an amount of ink per unit area of one of the images that is required to record the image; and
in the step of acquiring the hard-to-dry index, each of the images is divided into a plurality of portions, respective hard-to-dry index values are calculated for the portions, and a highest one of the hard-to-dry index values is used as the hard-to-dry index of the image data.

* * * * *